United States Patent
Röhm

(10) Patent No.: US 12,366,194 B2
(45) Date of Patent: Jul. 22, 2025

(54) EXHAUST GAS TAILPIPE ASSEMBLY FOR AN EXHAUST GAS SYSTEM OF A MOTOR VEHICLE

(71) Applicant: Dr. Ing. h.c. F. Porsche Aktiengesellschaft, Stuttgart (DE)

(72) Inventor: Heiko Röhm, Kernen im Remstal (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 62 days.

(21) Appl. No.: 18/224,139

(22) Filed: Jul. 20, 2023

(65) Prior Publication Data

US 2024/0044277 A1    Feb. 8, 2024

(30) Foreign Application Priority Data

Aug. 4, 2022    (DE) .............. 10 2022 119 557.0

(51) Int. Cl.
*F01N 13/08*    (2010.01)
*F01N 13/18*    (2010.01)

(52) U.S. Cl.
CPC ....... *F01N 13/082* (2013.01); *F01N 13/1822* (2013.01)

(58) Field of Classification Search
CPC ....... B60K 13/04; F01N 13/08; F01N 13/082; F01N 13/1822; F01N 13/1872; F01N 2470/18
See application file for complete search history.

(56) References Cited

U.S. PATENT DOCUMENTS

| | | | | |
|---|---|---|---|---|
| 10,823,038 | B2* | 11/2020 | Mueller | F01N 13/1838 |
| 2002/0053483 | A1* | 5/2002 | Ebinger | F01N 13/082 |
| | | | | 181/227 |
| 2004/0163874 | A1* | 8/2004 | Rinklin | B60K 13/04 |
| | | | | 180/309 |
| 2015/0337713 | A1* | 11/2015 | Callahan | F01N 13/14 |
| | | | | 165/135 |

FOREIGN PATENT DOCUMENTS

DE    102016123114 A1    5/2018

* cited by examiner

*Primary Examiner* — Anthony Ayala Delgado
(74) *Attorney, Agent, or Firm* — Buchanan Ingersoll & Rooney PC

(57) ABSTRACT

An exhaust gas tailpipe assembly for an exhaust gas system of a motor vehicle, having at least one exhaust gas tailpipe, which is annularly surrounded by a tailpipe aperture assembly at an end facing away from the exhaust gas system. The tailpipe aperture assembly is at least partially fixedly connected to a body part of the motor vehicle and includes at least one aperture part, such that the tailpipe aperture assembly can be slid, when viewed longitudinally, onto the exhaust gas tailpipe in a crash event. The exhaust gas tailpipe is configured so as to be curved with at least two exhaust gas tailpipe parts, wherein a longitudinal axis of a second exhaust gas tailpipe part extends at an angle to a longitudinal axis of a first exhaust gas tailpipe part. The aperture part includes at least one deformation region in a circumferential region facing the exhaust gas tailpipe.

13 Claims, 2 Drawing Sheets

EXHAUST GAS TAILPIPE ASSEMBLY FOR AN EXHAUST GAS SYSTEM OF A MOTOR VEHICLE

CROSS-REFERENCE TO RELATED APPLICATION

This application claims priority to German Patent Application No. 10 2022 119 557.0, filed Aug. 4, 2022, the content of such application being incorporated by reference herein in its entirety.

FIELD OF THE INVENTION

The invention relates to an exhaust gas tailpipe assembly for an exhaust gas system of a motor vehicle, having at least one exhaust gas tailpipe, which is annularly surrounded by a tailpipe aperture assembly at an end facing away from the exhaust gas system, wherein the tailpipe aperture assembly is at least partially fixedly connected to a body part of the motor vehicle and comprises at least one aperture part, such that the tailpipe aperture assembly can be slid, when viewed longitudinally, onto the exhaust gas tailpipe in a crash event.

BACKGROUND OF THE INVENTION

Such exhaust gas tailpipe assemblies for exhaust gas systems are sufficiently known in the prior art. In order to achieve design advantages, the exhaust gas tailpipes are provided with a tailpipe aperture assembly that is visible from the outside. However, these tailpipe aperture assemblies may not damage the exhaust gas tailpipes and/or the exhaust gas system in accordance with the requirements of so-called "pendulum tests" in a crash event. In order to ensure this, it is known, for example from the German disclosure DE 10 2016 123 114 A1, which is incorporated by reference herein, to provide an exhaust gas tailpipe assembly with an aperture part as a tailpipe aperture assembly, wherein the aperture part is fixedly connected to a body part detached from the exhaust gas tailpipe and can thus be pushed onto the exhaust gas tailpipe in a crash event. In order not to indirectly damage the exhaust gas tailpipe or the exhaust gas system through contact with a shielding element, the shielding element comprises a target breaking point, which breaks in the event of a shock-like contact with the aperture part and thus allows for a further movement of the aperture part. However, a prerequisite for a faultless protection of the exhaust gas tailpipe or the exhaust gas system is that a longitudinal axis of the exhaust gas tailpipe extends at least over a very large length coaxially to the longitudinal axis of the tailpipe aperture assembly. Such an exhaust gas tailpipe assembly is not suitable for curved exhaust gas tailpipes having at least two exhaust gas tailpipe parts which extend at an angle to one another. However, especially in light of the increasingly smaller design space, it is increasingly common to use curved exhaust gas tailpipes in order to optimally take advantage of this design space.

SUMMARY OF THE INVENTION

According to the invention, the exhaust gas tailpipe is configured so as to be curved with at least two exhaust gas tailpipe parts, wherein a longitudinal axis of a second exhaust gas tailpipe part extends at an angle $\alpha=90°-160°$ to a longitudinal axis of a first exhaust gas tailpipe part in the region of the tailpipe aperture assembly, wherein the at least one aperture part comprises at least one deformation region in a circumferential region facing the exhaust gas tailpipe. In the event of a "sliding" of the tailpipe aperture assembly caused by a crash event, this ensures that the tailpipe aperture assembly initially deforms before it can damage the exhaust gas tailpipe or the exhaust gas system. The basic design of the tailpipe aperture assembly need not be changed for this purpose.

In one advantageous embodiment, the deformation region is configured as a material dilution. Alternatively or additionally, the deformation region can also comprise material recesses. In addition, it is alternatively or additionally conceivable that the aperture part is constructed of different materials and the deformation region comprises a softer material than the aperture part itself.

In a particularly advantageous manner, the exhaust gas tailpipe comprises a shielding panel arranged so as to be spaced apart from the aperture part, wherein an outer diameter of the shielding panel is smaller than the inner diameter of the aperture part. It should be clear that when a plurality of aperture parts are present, the inner diameter of the smallest aperture part is meant here. Shielding panels can be provided for design reasons or also for noise optimization.

In a particularly advantageous and valuable embodiment, the tailpipe aperture assembly comprises a respective first and a respective second aperture part, which are connected to one another in a materially locking and/or positively locking manner, wherein one of the aperture parts is connected to the body part and the other aperture part comprises the deformation region.

BRIEF DESCRIPTION OF THE DRAWINGS

The invention will be explained in further detail with reference to a drawing, in which the following are shown.

DETAILED DESCRIPTION OF THE INVENTION

Figure 1:
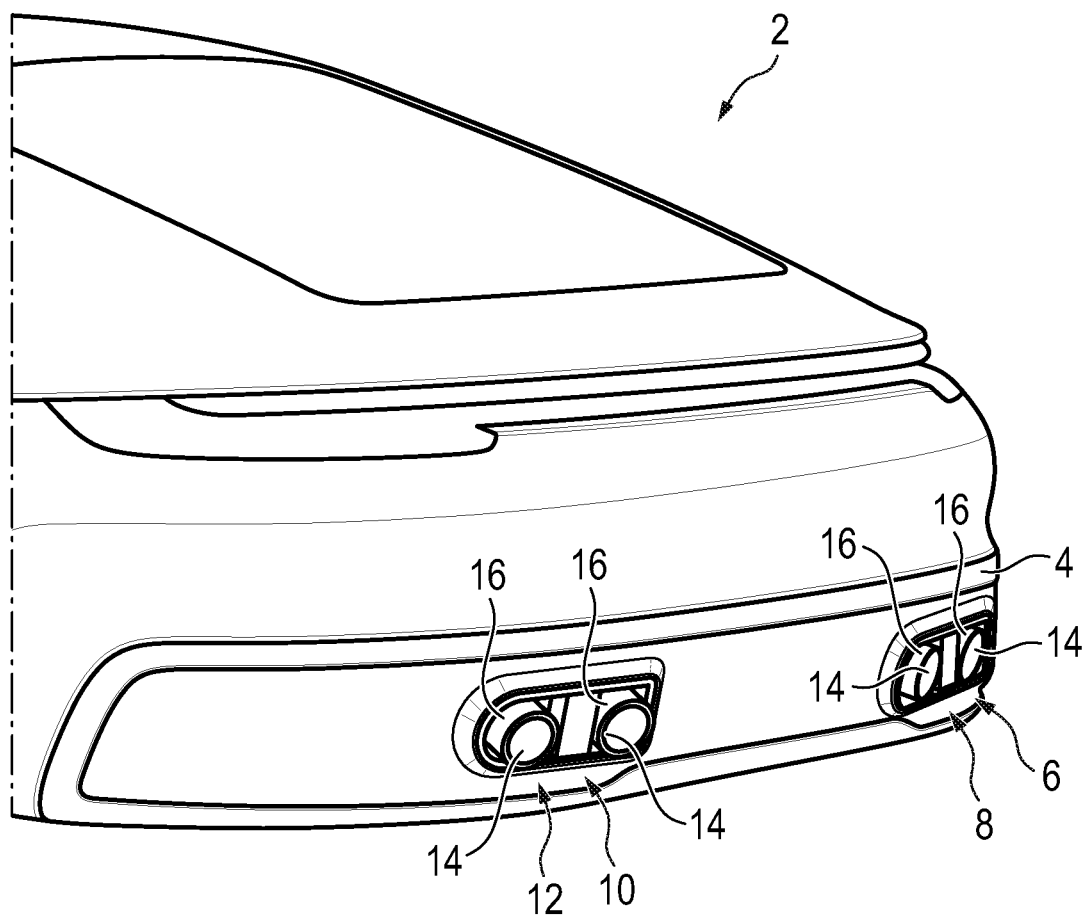
FIG. 1 is a perspective rear view of a motor vehicle.

FIG. 1 shows a perspective rear view of a motor vehicle 2 in whose rear part 4 as the body part four tailpipe aperture assemblies 6, 8, 10, and 12 are arranged, each comprising a first aperture part 14 and a second aperture part 16. In order to now prevent the tailpipe aperture assemblies 6, 8, 10, 12 from damaging an exhaust gas tailpipe 18, 20 located behind them (see FIG. 2) in a crash event, it is provided in the present exemplary embodiment that the first aperture part 14 has a respective deformation region 22 (see also FIG. 2, shaded region).

Figure 2:
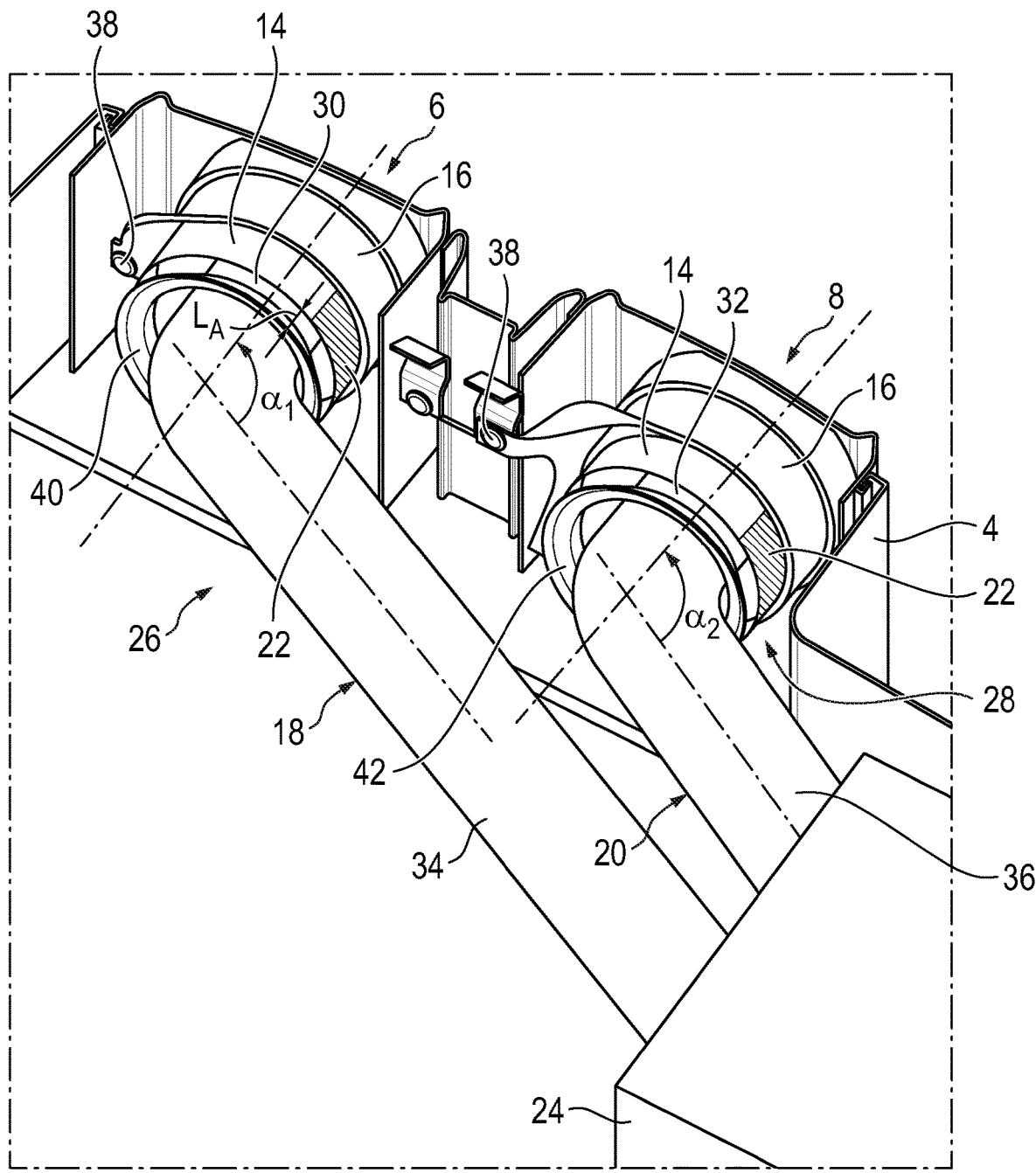
FIG. 2 is a perspective view of an exhaust gas tailpipe assembly.

FIG. 2 shows a perspective view of a purely schematically illustrated exhaust gas system 24 having two exhaust gas tailpipe assemblies 26, 28, which comprise the exhaust gas tailpipes 18, 20 as well as the tailpipe aperture assemblies 6, 8 in the rear part 4. The exhaust gas tailpipes 18, 20 are configured so as to be curved and have a respective first exhaust gas tailpipe part 30, 32, whose longitudinal axis extends coaxially to the longitudinal axis of the associated tailpipe aperture assembly 6, 8. This first exhaust gas tailpipe part 30, 32 then adjoins a second exhaust gas tailpipe part 34, 36, whose longitudinal axis extends at an angle $\alpha_1=103°$ and $\alpha_2=105°$ to the longitudinal axis of the first exhaust gas tailpipe part 30, 32 in the region of the tailpipe aperture assembly 6, 8. As noted above, the respective tailpipe aperture assembly 6, 8 comprises a respective first and a respective second aperture part 14, 16, which are connected to one another in a material-locking manner. The second aperture part 16 is fixedly connected to the rear part 4 via the fastening means 38. The first aperture part 14 respectively comprises the aforementioned deformation region 22, which in the present case is configured as a material dilution. However, alternatively or additionally, material recesses or a softer material can be provided. In a crash event, the respective aperture part 14 is then first pushed in the direction LA over the first exhaust gas tailpipe part 30 or 32 in order to then come into contact with the second exhaust gas tailpipe part 34 or 36 and then to deform. In the present exemplary embodiment, the exhaust gas tailpipes 18, 20 also comprise a respective shielding panel 40, 42, which serves on the one hand as a visual cover and on the other hand for noise optimization. The outer diameter of the respective shielding panel 40, 42 is smaller than an inner diameter of the respective aperture part 14 so that the aperture part 14 can move over the shielding panel 40, 42. It is finally noted that regions can also be provided on the rear part 4 which support or strengthen the effect of the tailpipe aperture assemblies 6, 8, 10, and 12.

What is claimed is:

1. An exhaust gas tailpipe assembly for an exhaust gas system of a motor vehicle, said exhaust gas tailpipe assembly comprising:
   at least one exhaust gas tailpipe,
   a tailpipe aperture assembly annularly surrounding the exhaust gas tailpipe at an end of the exhaust gas tailpipe that faces away from the exhaust gas system, wherein the tailpipe aperture assembly is configured to be at least partially fixedly connected to a body part of the motor vehicle and comprises at least one aperture part such that the tailpipe aperture assembly can slide, when viewed longitudinally, onto the exhaust gas tailpipe in a crash event,
   wherein the exhaust gas tailpipe is curved and has at least two exhaust gas tailpipe parts, wherein a longitudinal axis of a second exhaust gas tailpipe part extends at an angle a, which measures from 90° to 160°, to a longitudinal axis of a first exhaust gas tailpipe part in a region of the tailpipe aperture assembly, and
   wherein the at least one aperture part comprises at least one deformation region in a circumferential region facing the exhaust gas tailpipe.

2. The exhaust gas tailpipe assembly according to claim 1, wherein the deformation region is configured as a material weakness.

3. The exhaust gas tailpipe assembly according to claim 1, wherein the deformation region comprises material recesses.

4. The exhaust gas tailpipe assembly according to claim 1, wherein the aperture part comprises different materials, wherein the deformation region comprises a softer material than a material of the aperture part.

5. The exhaust gas tailpipe assembly according to claim 1, wherein the tailpipe aperture assembly comprises a respective first and a respective second aperture part, which are connected to one another in a materially locking and/or positively locking manner, wherein one of the two aperture parts is configured to be connected to the body part and the other aperture part comprises the deformation region.

6. A motor vehicle comprising the exhaust gas tailpipe assembly of claim 1.

7. The exhaust gas tailpipe assembly according to claim 1, wherein the deformation region is not directly attached to the exhaust gas tailpipe.

8. The exhaust gas tailpipe assembly according to claim 1, wherein the deformation region extends along the longitudinal axis of the first exhaust gas tailpipe part.

9. The exhaust gas tailpipe assembly according to claim 1, wherein the deformation region extends along a portion of a perimeter of the at least one aperture part.

10. The exhaust gas tailpipe assembly according to claim 1, wherein the deformation region extends to a free end of the aperture part.

11. The exhaust gas tailpipe assembly according to claim 1, wherein the exhaust gas tailpipe comprises a shielding panel arranged so as to be spaced apart from the aperture part, wherein an outer diameter of the shielding panel is greater than an inner diameter of the aperture part such that the at least one deformation region deforms against the shielding panel during the crash event.

12. The exhaust gas tailpipe assembly according to claim 11, wherein the shielding panel is positioned at an intersection between the two exhaust gas tailpipe parts.

13. The exhaust gas tailpipe assembly according to claim 11, wherein the shielding panel has a conical shape.

* * * * *